United States Patent [19]

Desurvire et al.

[11] Patent Number: 5,005,175
[45] Date of Patent: Apr. 2, 1991

[54] ERBIUM-DOPED FIBER AMPLIFIER

[75] Inventors: Emmanuel Desurvire; Clinton R. Giles, both of Middletown; Jay R. Simpson, Fanwood; John L. Zyskind, Shrewsbury, all of N.J.

[73] Assignee: AT&T Bell Laboratories, Murray Hill, N.J.

[21] Appl. No.: 441,495

[22] Filed: Nov. 27, 1989

[51] Int. Cl.⁵ .......................... G02B 6/00; H01S 3/00
[52] U.S. Cl. ........................................ 372/6; 372/40; 372/71; 350/96.3; 350/96.34; 330/4.3
[58] Field of Search .............. 372/6, 969, 70, 71, 372/75, 33, 41, 40, 66; 350/96.30, 96.34; 330/4.3

[56] References Cited

U.S. PATENT DOCUMENTS 4,780,877 10/1988 Snitzer .................................... 372/6
4,860,295 8/1989 Byer et al. ............................. 372/19

OTHER PUBLICATIONS

Desurvire et al., *Opt. Lett.* 12(11), Nov. 1987, "High-Gain Erbium-Doped Traveling-Wave Fiber . . .", pp. 888–890.
Miller et al., *Electron. Lett.*, 23(16), Jul. 30, 1987, "Low-Threshold CW Operation of an Erbium-Doped . . .", pp. 865–866.
Mears et al., *Electron. Lett.*, 22(3), 30 Jan. 1986, "Low-Threshold Tunable CW and Q-Switched . . .", pp. 159–160.
Electronics Letters, 5th Jan. 1989, vol. 25, No. 1, Laming et al., "Efficient Pump Wavelengths of . . .", pp. 12–14.

*Primary Examiner*—Frank Gonzalez
*Assistant Examiner*—Galen J. Hansen
*Attorney, Agent, or Firm*—Eli Weiss

[57] ABSTRACT

This invention is a rare earth doped optical amplifier with increased gain and lowered pump thresholds. The amplifying scheme is based on a 3 level lasing system rather than the more prevalent 4 level lasing system. Additionally, the transmission mode of the optical fiber at the pump wavelength has a radius which is substantially equal to or greater than the radius of the distribution profile of the rare earth ions in the fiber amplifier core. With the inventive amplifier, a gain of 37 dB and a saturation power of 11.3 dBm has been obtained with only 54 mW of launch power at $\lambda = 1.49$ $\mu$m.

15 Claims, 4 Drawing Sheets

ERBIUM-DOPED FIBER AMPLIFIER

TECHNICAL FIELD

This invention relates generally to fiber amplifiers and more particularly to erbium-doped fiber amplifiers.

BACKGROUND OF THE INVENTION

There is considerable interest in using rare earth doped fiber amplifiers to amplify weak optical signals for both local and trunk optical telecommunications networks. The rare earth doped optical amplifying fibers are found to have low cost, exhibit low-noise, relatively large bandwidth which is not polarization dependent, substantially reduced crosstalk problems, and low insertion losses at the relevant operating wavelengths which are used in optical communications. Contemplated rare earth doped optical fiber amplifiers can be coupled end-to-end to a transmission fiber, and transversely coupled, through a directional coupler, to a laser diode pump. The directional coupler is designed to have a high coupling ratio at the pump wavelength and a low coupling ratio at the signal wavelength so that maximum pump energy is coupled to the amplifier with minimal signal loss. When the amplifying medium is excited with the pump laser, signal light traversing the amplifier experiences gain. The pump energy may be made to propagate either co-directionally or contra-directionally relative to the signal energy, depending upon whether any remaining unconverted pump light can be more conveniently filtered at the transmitter or the receiver.

A complicating factor in the design of rare earth doped optical amplifiers involves the difference between the various parameters necessary to optimize the performance of the amplifier and those necessary to optimize the performance of the associated transmission fibers. These differences, which arise from the different functions performed by the optical amplifier and the transmission fiber, result in significant signal loss as the signal is transmitted from the transmission fiber to the amplifying fiber, and therefore place a premium on the efficiency of the amplifying fiber which restores the signal to its previous levels. In the transmission fiber, waveguide dispersion must be minimized in order to maximize bandwidth and minimize loss, thereby maximizing the spacing between repeaters. However, in the amplifying fiber, as opposed to the transmission fiber, the major concern involves high gain, high saturation power, and low noise, all with minimal pump powers. Exemplary signal losses that can occur because of the different optimal parameters for the transmission and amplifying fibers are splicing losses due to mode mismatch because the signal mode size may be significantly different for these two fibers.

To date, erbium fiber amplifiers appear to have the greatest potential for the high amplification necessary to overcome the signal losses due not only to normal signal processing but due to the mismatch between the transmission and amplification fibers mentioned above. Erbium doped fiber amplifiers operate at $\lambda = 1.53$ $\mu m$ which is of particular interest for optical communication systems because, in this wavelength region, the amplifiers exhibit low insertion loss, broad gain bandwidth (approximately 30 nm) and polarization insensitive gain. Such amplifiers, pumped at $\lambda = 1.48$ $\mu m$ can have a gain as high as 26 dB but require as much as 76 mW of launched pump power. A higher gain together with a lower value of pump power is preferred.

SUMMARY OF THE INVENTION

This invention is a rare earth doped optical amplifier with increased gain and lowered pump thresholds. The amplifying scheme is based on a 3 level lasing system rather than the more prevalent 4 level lasing system. Additionally, the transmission mode of the optical fiber at the pump wavelength has a radius which is substantially equal to or greater than the radius of the distribution profile of the rare earth ions in the fiber amplifier core. With the inventive amplifier, a gain of 37 dB and a saturation power of 11.3 dBm has been obtained with only 54 mW of launch power at $\lambda = 1.49$ $\mu m$.

DETAILED DESCRIPTION

Rare earth doped fibers for amplifying weak signals for both local and trunk optical telecommunications networks are of particular interest because of their low insertion loss, broad gain bandwidth and polarization insensitive gain. In use, the doped optical fiber is normally transversely coupled to a pump so that a weak optical input signal at some wavelength within the rare earth gain profile experiences a desired amplification. Pump light which can be coupled into the optical fiber via a directional coupler may propagate either co-directionally or contra-directionally within the fiber relative to the signal. The directional coupler can have a high coupling ratio at the pump wavelength and a low coupling ratio at the signal wavelength.

When the fiber is not pumped, the signal experiences loss due to ground state absorption by the rare earth ions. As the pump power that is applied to the fiber is increased, the loss due to ground level absorption decreases (i.e., gain is negative but increasing) until, at some value of pump power, there is no net signal absorption (i.e. the gain is zero). This is referred to as the transparency state. Thereafter, as the pump power in the fiber is increased, a higher proportion of rare earth ions are in their excited state and the stimulated emission from the upper lasing state to the ground state becomes stronger than the absorption from the ground state to the upper lasing state, resulting in a net positive gain at various wavelengths. Thus, the optical amplifier, when pumped so as to populate the upper lasing level, produces a net positive gain above the pump threshold level and the fiber acts as an amplifier.

Figure 1:
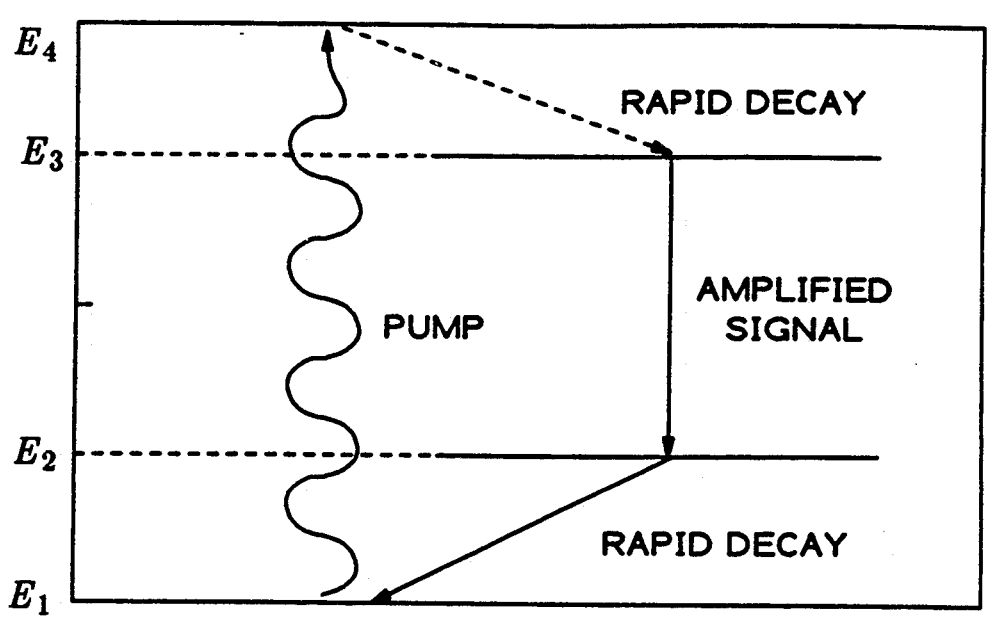
FIG. 1 is on energy level diagram showing population inversion and lasing for a non-semiconductor four level system.
Figure 2:
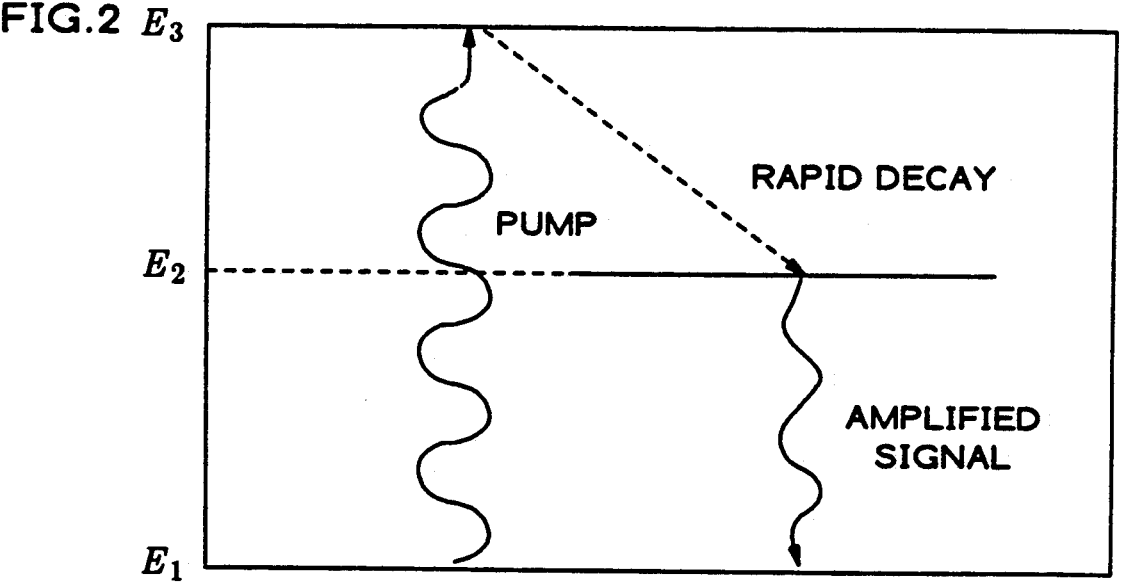
FIG. 2 is an energy level diagram showing population inversion and lasing for a non-semiconductor three level system.

There are two basic types of optical amplifiers. One type operates with a 4 level lasing system and the other operates with a 3 level lasing system. FIG. 1 illustrates a 4 level lasing system and FIG. 2 illustrates a 3 level lasing system. In each instance, pumping is effected by a separate laser or lamp which emits photons of an appropriate energy which is higher than that which corresponds to the signal wavelength. The electrons are excited from the ground state to one or more pump bands which are above the upper lasing level. A pump band can comprise a multiplet state in the Stark manifold. In the case of an ion in a glass, electronic states generally are broadened into Stark split manifolds. However, the different manifold multiplet states are usually not really discrete levels at room temperature because of homogeneous broadening. Depending upon the pump frequency, the electrons are excited to a level of the upper lasing state, and this level can be above level $E_4$ of FIG. 1 and $E_3$ of FIG. 2. The electrons then decay, normally nonradiatively from this level, to the upper lasing level. It is important that the spontaneous lifetime of the upper lasing level exceed that of the pump bands by a significant margin to allow heavy population of the upper level. When a photon at the laser wavelength interacts with an excited ion in the upper lasing state, stimulated emission can occur. The photon can come from either previous spontaneous emission, stimulated emission, or an input signal. At the lower level $E_2$ of FIG. 1 and $E_1$ of FIG. 2, a similar manifold can exist. The electrons will decay to some level in the lower manifold, the level to which it decays being represented by the wavelength at which it operates i.e., 1.53 $\mu$m–1.55 $\mu$m.

The difference between the 4 level lasing system of FIG. 1 and the 3 level lasing system of FIG. 2 is important to note. In the 3 level lasing system, the lower lasing level is either the ground state or so close to the ground state that it has a significant thermal population. In the 4 level lasing system, there is still a further transition from the lower lasing level to the ground state, and this is normally nonradiative in nature and much faster than the radiative transition. In a 3 level lasing system, absorption from the ground state directly to the upper lasing level takes place, decreasing the signal intensity and vitiating the effect of emission of lasing photons unless the ground state is depopulated by strong pumping. The significance of whether the laser is a 3 level laser system or a 4 level system lies mainly in the necessity in a 3 level lasing system to pump at a higher intensity to obtain population inversion. Thus, 3 level laser systems normally have higher values of threshold power than 4 level laser systems, especially for bulk, non-fiber active media and, therefore, 4 level laser systems are currently preferred. Rare earth doped optical fiber amplifiers operate in both 3 and 4 level modes.

Another difference between 3 and 4 level lasing systems lies in the dependence of gain on fiber length. In a 4 level system, assuming no imperfection losses, there is no point at which the gain will decrease as the fiber length is increased. In a 3 level system, there is an optimal length for which the maximum gain for a given pump power. This is an intrinsic property of a 3 level system even in the absence of imperfection losses. In an end-pumped 3 level fiber, the number of available pump photons and hence the population inversion will be greatest at the launch end and decreases monotonically along the fiber. The maximum gain for a given pump power is achieved when the fiber length is such that the pump power emerging from the other end of the fiber is exactly equal to the pump threshold power needed to achieve transparency. Every increment of the length up to that point contributes to net gain because the pump power there is above the pump threshold; every increment of length beyond that point detracts from the gain because the pump power is below the threshold level for transparency and the signal experiences a net loss in that region.

Another major difference between 3 level and 4 level systems lies in the dependence of saturation output power on pump power. In a 4 level system the saturation power is independent of pump power, while in a 3 level system the saturation output power depends linearly on the pump power and can be increased by increasing the pump power.

It is clear that the operation of an optical amplifier using a 4 level system device is significantly different from that of an optical amplifier using a 3 level system.

Optical fibers doped with rare earth such as erbium to form fiber amplifiers which operate a $\lambda = 1.53$ $\mu$m are of particular interest for optical communications because of their low insertion loss, broad gain bandwidth (~30 nm) and polarization insensitive gain. Recent developments have demonstrated that erbium-doped fiber amplifiers can be pumped with laser diodes which operate at a pump wavelength of $\lambda_p = 1.48$ $\mu$m or $\lambda_p - 980$ nm. It is to be noted that erbium-doped optical amplifiers use 3 level systems.

Figure 3:
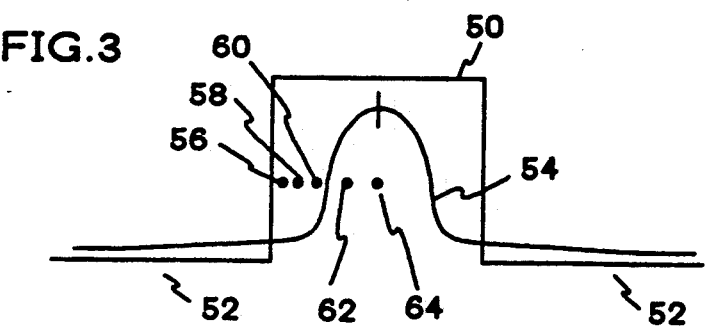
FIG. 3 is a plot of the index of refraction of an erbium-doped fiber superimposed on a plot of the intensity profile of the pump mode of prior art optical amplifier.

Presently, erbium-doped fiber amplifiers have high threshold powers which are obtained because the cores are large relative to the power mode size. Referring to FIG. 3, there is illustrated a plot of a prior art erbium-doped fiber amplifier having a high pump threshold. The center step portion 50 represents the index of refraction of the erbium-doped core of the single mode fiber and the ends 52 represent the index of refraction of the cladding of the single mode fiber. The core of the optical fiber which can be made from glass and, therefore, is referred to as the glass host is uniformly doped with the rare earth dopant erbium and the index of refraction of the core is greater than that of the cladding. The curve of the pump mode 54 of the fiber is illustratively superimposed on the plot of the index of refraction of the optical fiber. The radius of the core 50 of the erbium-doped fiber is large compared to the radius of the pump mode 54 of the fiber. Included in FIG. 3 are representative atoms 56, 58, 60, 62, 64 of erbium which may be substantially uniformly distributed across the core. In operation, erbium atoms 62 and 64 are near or at the center of the fiber and are exposed to the maximum intensity of the pump mode. Obviously they are excited from the ground state to a band which is above the upper lasing level. This, however, does not occur for those erbium atoms 56, 58, 60 which are positioned near the edge of the core. From FIG. 3, it can be seen that the intensity of the mode at and near the edge of the core is substantially reduced relative to the peak value at the center of the core. In practice, this reduction may be such that the erbium atoms at the edge of the core do not see a sufficient flux of pump photons to yield a net gain. Such atoms contribute only to signal absorption which reduces the overall fiber gain experienced by the signal mode. As noted previously, in a 3 level lasing system, the lower lasing level is either the ground state or at a level so close to the ground state that it has a significant thermal population. Because the atoms of erbium 56, 58, 60 located in the low intensity area spend most of their time at the lower lasing level, not only do they not materially contribute to the gain process, but they contribute to absorption, decreasing the efficiency of the amplifier. In a 4 level system, on the other hand, atoms in the low pump region spend most of their time in the ground state which is not the lower lasing state thus they are just passive observers; they do not participate in the gain, but contrary to the case of the 3 level system, they do not absorb at the signal wavelength either and thus do not degrade the gain. In a 4 level lasing system it is desirable to have a large cavity to keep the signal intensities below the saturation intensity to achieve a high saturation output power.

In this invention, a more efficient erbium-doped fiber amplifier is disclosed which provides gains from $+2.5$ dB to $+37$ dB with pump powers at $\lambda = 1.49$ $\mu$m in the 11 mW–54 mW range. Corresponding saturation output powers of $+2.5$ dBm to $+11$ dBm have been achieved. Measurements made with the new improved optical amplifier here disclosed show a maximum gain coefficient of $2.1 \pm 0.1$ dB/mW. This value of gain coefficient represents the highest value reported to date for erbium-doped fiber amplifiers pumped in the $\lambda_p = 1.48$–$1.49$ $\mu$m absorption band. For the 54 mW launched pump power, a high saturation output signal power of $+11$ dBm has been measured. This is a dramatic improvement over the $+2.5$ dBm value previously reported for this pump wavelength.

The erbium-doped fiber amplifier which provides the above mentioned results has a core radius of 1.81 $\mu$m and a Numerical Aperture of 0.23. The $Er^{3+}$ concentration is $p = 2 \times 10^{24}$ m$^{-3}$ which corresponds to an $Er_2O_3$ concentration of approximately 50 ppm.

When erbium is the active ion, an increase in efficiency is obtained by using a core doped with both Aluminum and Germanium as major dopants to raise the core refractive index, rather than just Germanium alone as is the current practice for erbium doped fiber amplifiers. When Aluminum is added, the absorption and fluorescence profiles of the $Er^{3+}$ ions are altered in a manner which is favorable for pumping in the 1.46–1.49 $\mu$m wavelength band because, in this wavelength range, the absorption is high and the fluorescence is low for Aluminum doped cores.

Figure 4:
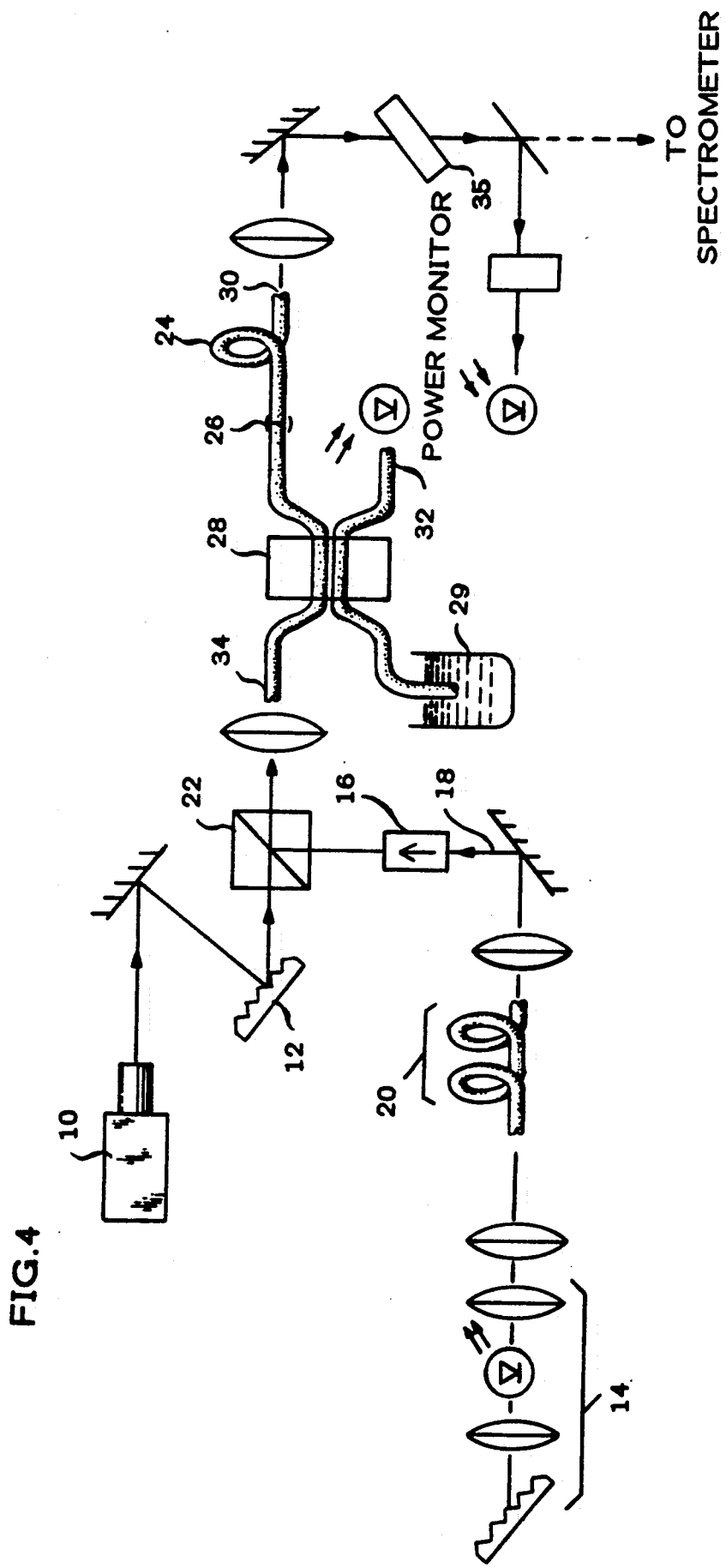
FIG. 4 is a schematic diagram of structure for testing the erbium doped fiber amplifier.

Referring to FIG. 4, there is illustrated a schematic of a test setup for testing the erbium-doped fiber amplifier. A NaCl:OH color-center laser 10 operating at $\lambda_p = 1.493$ $\mu$m is used as the pump. A trade-off between maximum output power for the color-center laser 10 and the operating wavelength resulted in this specific pump wavelength being selected as being optimal. It is to be understood, however, that this laser may not represent the optimal pump wavelength for achieving the highest erbium-doped fiber amplifier gains. A grating 12 is used to reject unwanted light at $\lambda = 1.064$ $\mu$m which originates at the color center laser pump. A tunable external cavity laser diode 14 which operates around $\lambda_s 1.531$ $\mu$m is used for the signal. A Faraday isolator 16 is used to prevent feedback from backward ASE onto the signal laser and also prevents feedback from reflections into the erbium-doped fiber amplifier. A fiber pig-tail 18 (not shown) with low-reflectivity index-matching windows is placed between a fiber polarization controller 20 and the Faraday isolator 16. Maximization of the signal passing through the Faraday isolator is achieved through the fiber polarization controller 20.

A polarizing beam splitter 22 is used to combine the pump and the signal into one fiber of a fused fiber coupler 28 with a low coupling coefficient of $n = 0.012$. The erbium doped fiber amplifier 24 is butt-spliced at 26 to the straight through output fiber of coupler 28. The output end 30 of the erbium-doped fiber is polished at a ten degree angle to prevent feedback into the erbium-doped fiber amplifier. The 1% output port 32 of the coupler is used to monitor the pump and signal input to the erbium-doped fiber amplifier. The other end of the monitor lead is immersed in index-matching oil 29 which is used to suppress unwanted reflections and Fabry-Perot effects. The end, 34, of the coupler input fiber lead is polished at a ten degree angle to prevent feedback.

The erbium-doped fiber core radius is 1.81 $\mu$m and the Numerical Aperture is 0.23. Its power mode size (radius) of $\omega' = 3$ $\mu$m was obtained experimentally using near-field imaging. The power mode size of the coupler fiber is $\omega = 4.4$ $\mu$m. The erbium-doped fiber amplifier $Er^{3+}$ concentration is $p = 2 \times 10^{24}$ m$^{-3}$, which corresponds to an $Er_2O_3$ concentration of approximately 50 ppm. The coupling ratio between the input fiber lead and the fiber amplifier which was measured to be $\eta = 0.63$, corresponds to $-2.0$ dB coupling loss. This coupling loss is due to the slight mismatch between the mode envelopes of the amplifier fiber and the coupler fiber, to yield a non-optimized overlap integral. After passing through an interference filter 35 with 2.6 nm bandwidth (FWHM) centered at $\lambda_s = 1.531$ $\mu$m, the output of the erbium-doped fiber amplifier is directed either to a spectrometer to monitor the amplified signal or to a power meter for gain measurements.

Figure 5:
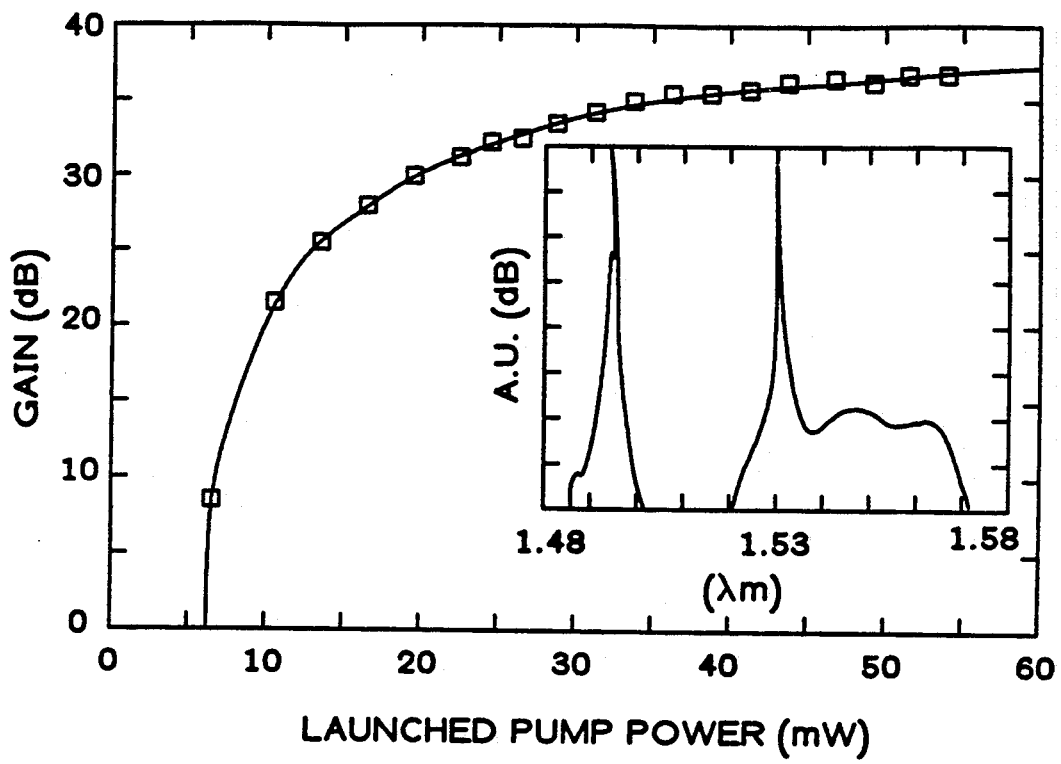
FIG. 5 is a plot of the signal gain at $\lambda_s = 1.531$ $\mu m$ as a function of launched pump power at $\lambda_p = 1.493$ $\mu m$.

The signal gain G as a function of pump power $P_p^{in}$ launched into the erbium-doped fiber amplifier is illustrated in FIG. 5. The fiber used to obtain the illustrated results has a length of 47.5 m. The insert in FIG. 5 illustrates the output spectrum with the pump tuned at $\lambda = 1.493$ $\mu$m and the signal at $\lambda = 1.531$ $\mu$m which is the frequency of the peak of the fluorescence spectrum. Fiber amplifier transparency (Gain = 0 db) was obtained with $P_p^{in} = 6.5$ mW. The input pump power required to achieve transparency for long fiber lengths is higher than the pump threshold which is required for medium inversion which is due to the pump decay along the fiber, illustrates that the fiber actually has a low inversion threshold.

With an input power of $P_p^{in} = 11.3$ mW, a gain of $+25.2$ dB is achieved. This corresponds to a gain coefficient of $g = 2.1 \pm 0.1$ dB/mW. This result in a dramatic improvement over the presently reported $g = 0.39$ dB/mW for 1.48 $\mu$m pump wavelength disclosed in Applied Phys. Letters, Vol. 54, No. 5, 1989 page 295 by M. Nakazawa, Y. Kimura and K. Suzuki.

A maximum gain of $+36.8 \pm 0.3$ dB is achieved with 53.6 mW launched pump power, which is slightly more than the highest gains of $+35$ dB reported for Erbium-doped fiber amplifiers when pumped with visible light and about 10 dB higher than the gains when pumped at 1.49 $\mu$m as reported in the Optical Fiber Communication Conference, 1989, Technical Digest Series, PD15-1 by K. Hagimoto et al. The improvement is attributed to the very low pump threshold of the fiber, which is a consequence of the small size of the pump mode.

The theoretical pump threshold $P_p^{th}$ at $\lambda_s$ is the solution of transcendental equation $$P_p^{th} = P^* \frac{\sigma_e + \sigma_a}{\sigma_e(1-\eta)} Pn \left[ \frac{P^* + P_p^{th}}{P^* + \eta P_p^{th}} \right] \quad (1)$$

where $\sigma_a$ and $\sigma_e$ are the absorption and emission cross-sections at $\lambda_s$, respectively, $\eta = \exp(-a^2/\omega^2)$ where a = fiber core radius, $\omega$ is the radius of the mode which corresponds $1/\epsilon$ times the maximum intensity at the mode center, and $P^* = \bar{h}_p{}^\nu \pi a^2/\sigma_p \tau$ with $\bar{h}_p{}^\nu$ = pump photon energy, $\sigma_p$ = pump absorption cross section and $\tau$ = fluorescence lifetime of the $^4I_{13/2}$ level.

Using the fluorescence lifetime and the cross sections measured for this fiber, they being $\tau = 10$ ms, $\sigma_a(1.49 \mu m) = 2 \times 10^{-25}$ m$^2$, $\sigma_a(1.53 \mu m) = 4 \times 8 \times 10^{-25}$ m$^2$, $\sigma_e(1.53 \mu m) = 8 \times 1 \times 10^{-25}$ m$^2$; the fiber parameters are obtained from relationship (1) $P_p^{th} = 1.35$ mW, which is consistent with the $P_p^{th} = 6.5$ mW required to achieve transparency in the erbium-doped fiber amplifier as transparency requires that the pump be several times above threshold at the input end of the fiber. Thus, the maximum launched power of $P_p^{th} = 54$ mW represents highly pumped conditions with a ratio $P_p^{in}/P_p^{th} \sim 40$, resulting in the high gain measured for the fiber. Note that pump thresholds significantly lower than $P_p^{th} = 1.3$ mW can be obtained by adjusting the value of the parameter $\omega$ to values lower than 3 $\mu$m, e.g. 1.5 $\mu$m which can be done by increasing the fiber index difference to $\Delta_n = 0.03$ and reducing the fiber core radius to a = 1.5 $\mu$m.

Thus, from equation (1) which describes the relationship of the pump threshold relative to the property of the waveguide, the pump threshold should be as low as possible to obtain improved efficiency.

Figure 6:
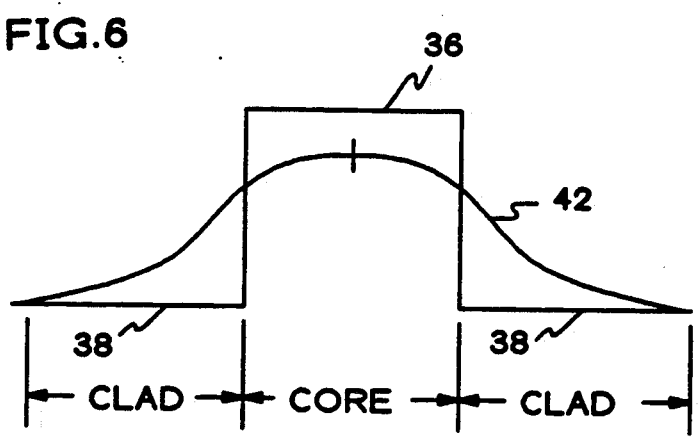
FIG. 6 is a plot of the index of refraction of an erbium-doped fiber superimposed on a plot of the intensity profile of the pump mode in accordance with the principles of the invention.

FIG. 6 is a plot of the index of refraction of an erbium-doped fiber amplifier in accordance with the principles of the invention wherein the fiber is designed to have a low pump threshold. The center step portion 36 represents the index of refraction of the erbium-doped core of the single mode fiber and the ends 38, represent the index of refraction of the cladding of the single mode fiber. The core of the optical fiber contains the erbium and the index of refraction of the core is greater than that of the cladding. The curve of the pump mode 42 of the fiber is illustratively superimposed on the plot of the index of refraction of the optical fiber. In accordance with the results of equation (1), the radius of the core 36 of the erbium-doped fiber is equal to or less than to the radius of the pump mode of the fiber. Thus, because the radius of the erbium-doped core is equal to or less than the radius of the pump mode of the fiber, each atom of erbium in the core cross-section is exposed to substantially equal levels of the high intensity portion of the pump mode. In an optical fiber amplifier having a core which is substantially uniformly doped with erbium, a high operating efficiency is obtain when the core has a radius of 1.8 $\mu$m, and when the differential of the index of refraction of the core relative to the cladding is substantially 0.019, and the power mode size $\omega$ of the pump does not exceed substantially 3 $\mu$m. In accordance with the principles of the invention, it is suggested that: the distribution profile of the rare earth ions be maintained at less than 1.9 $\mu$m; the radius of the mode of the pump signal not exceed 3 $\mu$m; the doped core of the fiber has a radius within the range of 1.0 $\mu$m to 1.9 $\mu$m and the fiber index difference is between 0.04 and 0.019; the fiber has a numerical aperture which is within a range having a lower limit of 0.2 and an upper limit of 0.35; and, the mode dimension of the fiber be within a range having a lower limit of 1.5 $\mu$m and an upper limit of 3 $\mu$m.

Figure 7:
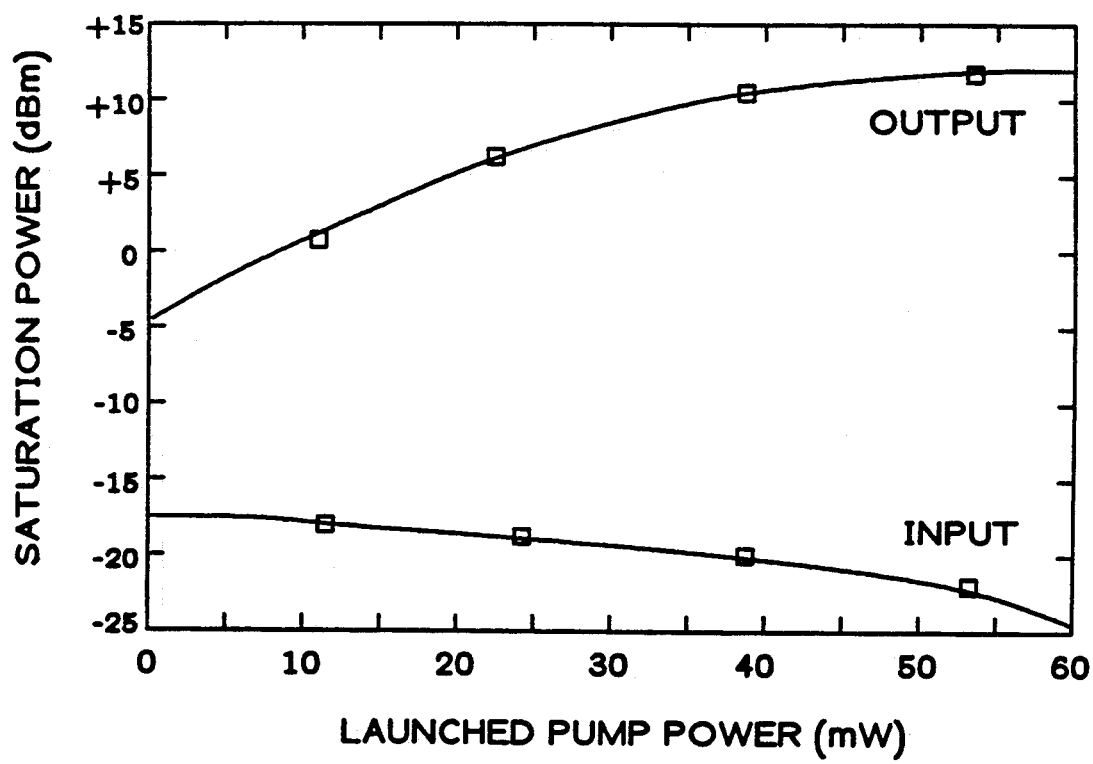
FIG. 7 is a plot of input and output signal saturation powers as a function of the launched pump power.

Referring to FIG. 7, there is illustrated the input and output signal saturation powers which result in 3 dB gain compression as a function of the launched pump power. The FIG. shows that, as the pump is increased, the input saturation power $P_{sat}^{in}$ decreases and the output saturation power $P_{sat}^{out}$ increases. It is to be noted that the output power increases substantially linearly with increasing pump power up to 11 dBm. An output saturation power of $P_{sat}^{out} = 11.3$ dBm is achieved with the maximum available launched pump power i.e., $P_p^{in} \sim 53.6$ mW corresponding to the maximum gain Gmax = 37.1 dB. This result is a dramatic improvement over the $P_{sat}^{out} = +2.5$ dBm, Gmax = +26 dB values reported in the Optical Fiber Communication Conference, 1989, Technical Digest Series, PD15-1 (Optical Society of America, Washington, D.C. 1988) by K. Hagimoto et al. The range of output saturation powers illustrated in FIG. 4, i.e., $P_{sat}^{out} = +2.5$ dBm to +11.3 dBm is comparable to the results obtained with traveling-wave semiconductor amplifiers, i.e., $P_{sat}^{out} = +5$ dBm to +12.5 dBm. Clearly, with this invention, fiber-to-fiber gains in excess of +30 dB are now possible with 1.49 $\mu$m laser diode pump.

We claim:

1. An optical amplifier comprising a single mode optical fiber having a core surrounded by a cladding, said core being doped with rare earth ions having a distribution profile, and means for generating a pump signal at a pump wavelength, said pump wavelength capable of coupling the ground state of the rare earth ions to an excited state which is an upper pump level of a three level lasing system having the ground state as the lower level of the lasing transition, said generating means being optically coupled to said optical fiber, the transmission mode of the optical fiber at the pump wavelength having a radius which is greater than the radius of the distribution profile of the rare earth ions in the core.

2. The optical amplifier of claim 1 characterized in that the distribution profile of the rare earth ions in the core has a radius which is less than 1.9 $\mu$m.

3. The optical amplifier of claim 1 characterized in that said rare earth ions comprise erbium.

4. The optical amplifier of claim 2 characterized in that the radius of the mode of said pump signal does not exceed 3 $\mu$m.

5. The optical amplifier of claim 4 characterized in that the doped core of said fiber has a radius within the range of 1.0 $\mu$m to 1.8 $\mu$m and the fiber index difference is between 0.04 and 0.019.

6. The optical amplifier of claim 5 characterized in that the doped core of said fiber has a radius of substantially 1.8 $\mu$m and an index difference of the core relative to the cladding of substantially 0.019.

7. The optical amplifier of claim 5 characterized in that said fiber has a numerical aperture which is within a range having a lower limit of 0.2 and an upper limit of 0.35.

8. The optical amplifier of claim 7 characterized in that
the numerical aperture of said fiber is substantially 0.23.

9. The optical amplifier of claim 3 characterized in that
the mode dimension of said fiber is within a range having a lower limit of 1.5 μm and an upper limit of 3 μm.

10. The optical amplifier of claim 9 characterized in that
said optical fiber is coupled to receive pump energy substantially in the 1.46–1.49 μm absorption band.

11. The optical amplifier of claim 11 characterized in that
said core is a glass host.

12. The optical amplifier of claim 11 characterized in that
said glass host core is silica with dopants in addition to erbium to raise the refractive index of the core.

13. The optical amplifier of claim 13 characterized in that
said index raising dopants in core comprises Aluminum as a significant constituent.

14. The optical amplifier of claim 7 characterized in that
the output power increases substantially linearly with increasing pump power up to 11 dBm.

15. A method of amplifying an optical signal comprising the steps of
generating a pump signal at a pump wavelength,
applying the pump signal to a single mode optical fiber having a core surrounded by a cladding, said core being doped with rare earth ions having a distribution profile and the pump wavelength being capable of coupling the ground state of the rare earth ions to an excited state which is an upper pump level of a three level lasing system having the ground state as the lower level of the lasing transition,
causing the transmission mode of the optical fiber at the pump wavelength to have a radius which is greater than the radius of the distribution profile of the rare earth ions in the core, and
applying to the single mode optical fiber an optical signal for amplification.

* * * * *